(12) United States Patent
Caulfield et al.

(10) Patent No.: US 10,812,415 B1
(45) Date of Patent: Oct. 20, 2020

(54) ACTIVE INTELLIGENT MESSAGE FILTERING FOR INCREASED DIGITAL COMMUNICATION THROUGHPUT AND ERROR RESILIENCY

(71) Applicant: Microsoft Technology Licensing, LLC, Redmond, WA (US)

(72) Inventors: Adrian Michael Caulfield, Woodinville, WA (US); Michael Konstantinos Papamichael, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/539,958

(22) Filed: Aug. 13, 2019

(51) Int. Cl.
*G06F 15/16* (2006.01)
*H04L 12/939* (2013.01)
*H04L 12/26* (2006.01)

(52) U.S. Cl.
CPC .......... *H04L 49/555* (2013.01); *H04L 43/028* (2013.01); *H04L 43/0847* (2013.01); *H04L 49/557* (2013.01)

(58) Field of Classification Search
CPC ... H04L 49/555; H04L 49/557; H04L 43/028; H04L 43/0847
See application file for complete search history.

(56) References Cited

U.S. PATENT DOCUMENTS

| | | | | |
|---|---|---|---|---|
| 2010/0138893 A1* | 6/2010 | Li | ................... | H04L 63/20 726/1 |
| 2017/0105137 A1* | 4/2017 | Hung | ................... | H04L 43/028 |
| 2018/0324061 A1* | 11/2018 | Khanal | ............... | H04L 43/028 |
| 2020/0067880 A1* | 2/2020 | Kim | ................... | H04L 63/02 |
| 2020/0162503 A1* | 5/2020 | Shurtleff | ........... | H04L 63/1416 |

* cited by examiner

*Primary Examiner* — Philip B Tran

(74) *Attorney, Agent, or Firm* — Watson Patents, PLC; Vladan M. Vasiljevic

(57) ABSTRACT

Active intelligent message filtering can be utilized to provide error resiliency, thereby allowing messages to be received without traditional error detection, and, in turn, avoiding the inefficiency of retransmission of network communications discarded due to network transmission errors detected by such traditional error detection mechanisms. Network transmission errors can result in the receiving application receiving messages that appear to comprise values that differ from the values originally transmitted by the transmitting application. Based on the inaccuracy tolerance applicable to the transmitting and receiving applications, rules can be applied to actively intelligently filter the received messages to replace the received values with the replacement values according to the rules. In such a manner, the receiving application can continue to receive usable data from the transmitting application without any error detection at lower network communication levels.

20 Claims, 6 Drawing Sheets

ACTIVE INTELLIGENT MESSAGE FILTERING FOR INCREASED DIGITAL COMMUNICATION THROUGHPUT AND ERROR RESILIENCY

BACKGROUND

Computer network communications between a transmitting computing device and a receiving computing device typically entail the transmitting computing device dividing the digital data to be sent into discrete packets and transmitting the packets across the computer network, and typically entail the receiving computing device receiving the packets from the computer network and re-assembling the digital data therefrom. Because computer network communications can be transmitted across lossy communication media, error detection and/or error correction schemes are often utilized. One common error detection scheme can entail the utilization of error detection codes on a per packet basis. A received packet whose error detection code does not match an expected value can be discarded, and, if appropriate, the receiving computing device can request the transmitting computing device to retransmit the discarded packet.

Each retransmission renders the overall computer network communication less efficient, such as by reducing the throughput of the digital data being transmitted between the transmitting computing device and the receiving computing device. In some instances, error detection may not be applied to computer network communications, thereby increasing the throughput of the digital data being transmitted between the transmitting computing device and the receiving computing device. In such instances, however, there is no mechanism to determine whether or not any portion of a received packet was received properly, and, as such, such mechanisms are can only be properly utilized where the receiving computing device is agnostic as to the correctness of any particular packet.

SUMMARY

Active intelligent message filtering can be utilized to provide error resiliency, thereby allowing messages to be received without traditional error detection, and, in turn, avoiding the inefficiency of retransmission of network communications discarded due to network transmission errors detected by such traditional error detection mechanisms. Transmitting and receiving applications can communicate in a known manner such that rules can be utilized to actively intelligently filter messages received by a receiving application. Network transmission errors can result in the receiving application receiving messages that appear to comprise values that differ from the values originally transmitted by the transmitting application. Based on the inaccuracy tolerance applicable to the transmitting and receiving applications, rules can be applied to actively intelligently filter the received messages to replace the received values with the replacement values according to the rules. In such a manner, the receiving application can continue to receive usable data from the transmitting application without any error detection at lower network communication levels, and, consequently, without the inefficiency of retransmission of network communications that would otherwise have been discarded due to the detection of network transmission errors. The rules by which active intelligent message filtering can be implemented can specify rule preconditions and instructions for generating replacement values of received values that meet the rule preconditions. Such rule preconditions can include range-based preconditions, error detection preconditions based upon focused error detection mechanisms implemented at higher levels, as opposed to traditional lower level network error detection, and other like preconditions. The instructions for generating replacement values can be based on constant values, values that can be dependent upon one or more previously received values, values that can be generated with reference to other data, such as error correction data, or combinations thereof.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
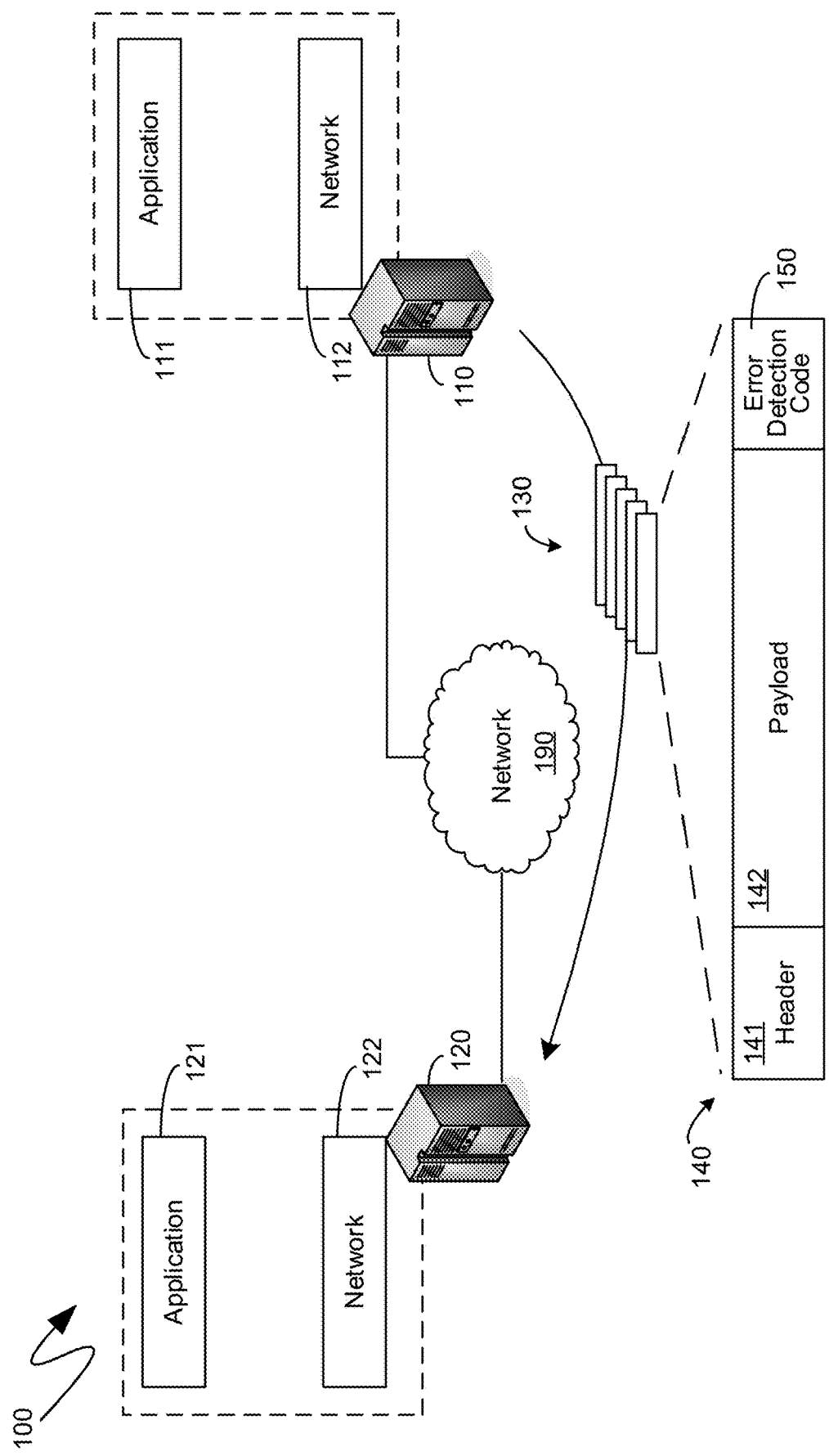
FIG. 1 is a system diagram of an exemplary system utilizing packet-based error detection and retransmission.

The following description relates to active intelligent message filtering mechanisms that can provide error resiliency, thereby allowing messages to be received without traditional error detection, and, in turn, avoiding the inefficiency of retransmission of network communications discarded due to network transmission errors detected by such traditional error detection mechanisms. Transmitting and receiving applications can communicate in a known manner such that rules can be utilized to actively intelligently filter messages received by a receiving application. Network transmission errors can result in the receiving application receiving messages that appear to comprise values that differ from the values originally transmitted by the transmitting application. Based on the inaccuracy tolerance applicable to the transmitting and receiving applications, rules can be applied to actively intelligently filter the received messages to replace the received values with the replacement values according to the rules. In such a manner, the receiving application can continue to receive usable data from the transmitting application without any error detection at lower network communication levels, and, consequently, without the inefficiency of retransmission of network communications that would otherwise have been discarded due to the detection of network transmission errors. The rules by which active intelligent message filtering can be implemented can specify rule preconditions and instructions for generating replacement values of received values that meet the rule preconditions. Such rule preconditions can include range based preconditions, error detection preconditions based upon focused error detection mechanisms implemented at higher levels, as opposed to traditional lower level network error detection, and other like preconditions. The instructions for generating replacement values can be based on constant values, values that can be dependent upon one or more previously received values, values that can be generated with reference to other data, such as error correction data, or combinations thereof.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including servers, hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary system 100 is illustrated, providing context for the descriptions below. The exemplary system 100 comprises an exemplary transmitting computing device 110 and an exemplary receiving computing device 120, communicationally coupled to each other via the exemplary network 190. The exemplary transmitting computing device 110 can have executing thereon a transmitting application, such as the exemplary transmitting application 111. The exemplary transmitting application 111 can transmit messages to a receiving application executing on the exemplary receiving computing device 120, such as the exemplary receiving application 121.

The network 190 can be a packetized communication network, whereby digital data is communicated across the network 190 in the form of discrete, individual packets of data transmitted, such as from the exemplary transmitting computing device 110, to the exemplary receiving computing device 120. Thus, messages transmitted by the exemplary transmitting application 111 can be received by lower layer networking software executing on the exemplary transmitting computing device 110, such as the exemplary network software 112, which can packetize the messages generated by the exemplary transmitting application 111 for transmission across the packetized communication network represented by the exemplary network 190.

FIG. 1 illustrates an exemplary sequence of packets 130 comprising an exemplary packet 140, being transmitted from the exemplary transmitting computing device 110 to the exemplary receiving computing device 120. As utilized herein, the term "message" means a collection of data, generated by a transmitting application, as a discrete communication to a receiving application, and recognizable by the receiving application as such. Accordingly, a single message may be packetized into a single packet for transmission across a network, or it may be packetized into multiple packets which can be transmitted sequentially or otherwise across the network.

Typically, a packet, such as the exemplary packet 140, can comprise an error detection code, such as the exemplary error detection code 150. Such an error detection code can be utilized to detect transmission errors in the packet 140. More specifically, upon receipt of the exemplary packet 140, such as by the exemplary receiving computing device 120, lower layer networking software executing on the receiving computing device 120, such as the exemplary networking software 122, can independently derive an error detection code from the data of the packet 140. If the error detection code derived by the exemplary networking software 122, at the receiving computing device 120, based upon the data of the packet 140 as received by the receiving computing device 120, differs from the error detection code 150 that was received, as part of the packet 140, by the receiving computing device 120, a determination can be made that the digital data of the packet 140 was improperly received by the receiving computing device 120, and appropriate steps can be taken by the receiving computing device 120. Typically, such appropriate steps include the networking software 122 discarding the received packet 140, and a retransmission of the packet 140 being requested, either by the networking software 122 or by higher layer software executing on the receiving computing device 120.

If a packet, such as the exemplary packet 140, is discarded by the receiving computing device 120, the overall throughput of data from the transmitting computing device 110 to the receiving computing device 120 across the network 190 can be decreased, and the efficiency of such communications can be reduced. To avoid such a decrease in throughput and efficiency, packets can be transmitted without an error detection code, such as the exemplary error detection code 150, or the receiving computing device 120 can be instructed to not perform a check of a received packet, such as the packet 140, utilizing the error detection code 150. In such an instance, however, any portion of the packet 140 may have been transmitted or received with incorrect data. Within the context of the exemplary transmitting application 111 and receiving application 121, errors introduced during transmission across the network 190 can manifest in the form of differences between values sent in messages generated by the transmitting application 110 and values as received in those messages, having had errors introduced during transmission across the network 190, by the receiving application 121.

In some instances, applications can be inherently resilient to errors, such as differences between a transmitted value and a received value. For example, in machine learning contexts, values can be iteratively generated, with each iteration narrowing a range of acceptable, or expected, values. Within any particular iteration, the precise value may not matter, and there may be a tolerance for variations within values, at least within a definable range. Colloquially, a precise value may not be critical, and values that are "close enough" may result in ultimate results, or end products, that are indistinguishably different from the results or end products that would have been generated had greater precision been utilized. As another example, in large data contexts, a quantity of values can be sufficiently great that a small quantity of outlier values can have little to no distinguishable impact upon the ultimate results or end products generated by analysis of such large data. Again, colloquially, in such an instance, a precise value may not be necessary, and values that are "close enough" may be sufficient. In such instances, rules can define values that can be outside of acceptable ranges, values that can be sufficiently important to justify targeted error detection and/or error correction, or other rule preconditions that can determine whether or not a rule, defining how values meeting such preconditions are to be treated, is applied. The application of the rule can result in received values being actively intelligently filtered, by such a rule, resulting in generated values that differ from the received values. Such received values can then be replaced by the generated values and provided to a receiving application. In such a manner, the inefficiency of traditional packet-based error detection and/or correction can be avoided and values that are affected by network transmission errors, or other errors, can be actively intelligently filtered sufficiently to maintain high throughput and efficiency without negatively impacting the accuracy, reliability, or correctness of the results and/or end products.

Figure 2:
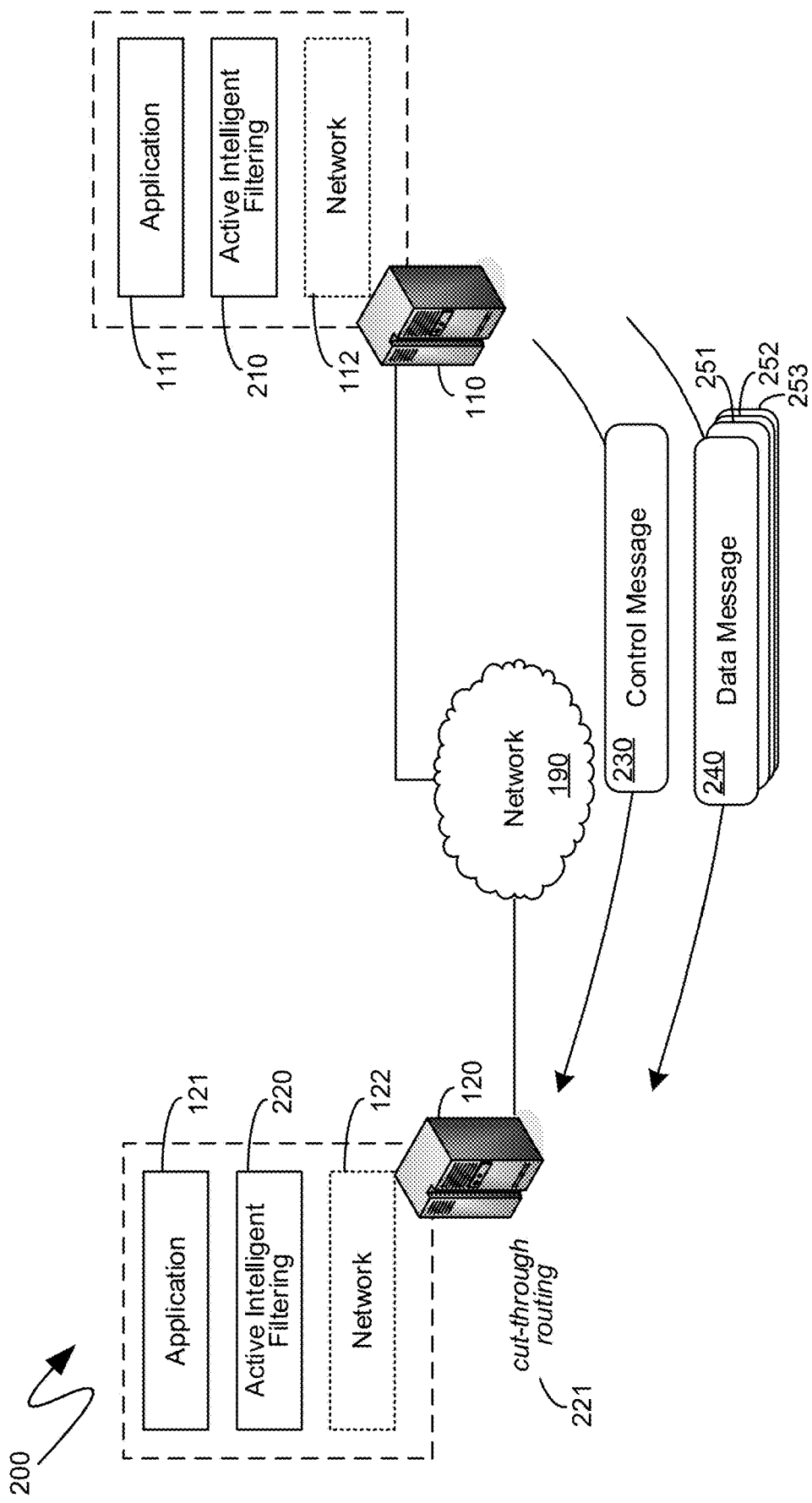
FIG. 2 is a system diagram of an exemplary system utilizing active intelligent message filtering.

Turning to FIG. 2, the exemplary system 200 shown therein illustrates an exemplary active intelligent filtering, such as the exemplary active intelligent filtering component 220, executing on the exemplary receiving computing device 120, and the exemplary active intelligent filtering component 210, executing on the exemplary transmitting computing device 110. According to one aspect, the exemplary active intelligent filtering component 210 can generate one or more rules by which the active intelligent filtering component 220 can generate replacement values for received values that meet the preconditions for those rules, and, more generally, in order to provide error resiliency through active intelligent filtering. Such rules can be communicated from the active intelligent filtering component 210 to the active intelligent filtering component 220 via one or more control messages, such as the exemplary control message 230. Additionally, values and other data can be communicated between the exemplary application 111, executing on the transmitting computing device 110, and the exemplary application 121, executing on the receiving computing device 120, via data messages, such as the exemplary data message 240.

According to one aspect, a single control message 230 can apply to a single data message, such as the exemplary data message 240. In such a case, the control message 230 can be packetized into a same packet as the exemplary data message 240, or, more generally, a same message as the exemplary data message 240. According to another aspect, a single control message, such as the exemplary control message 230, can apply to multiple data messages, such as the exemplary data message 240, as well as, in addition, the exemplary data messages 251, 252 and 253. In such an instance, the exemplary control message 230 can comprise an identification of the data messages, such as the exemplary data messages 240, 251, 252 and 253, to which it applies. Such an identification can be either implicit or explicit. For example, as an implicit identification, the exemplary control message 230 can provide one or more rules that can apply to the values of all subsequent data messages, including, for example, the exemplary data messages 240, 251, 252 and 253, until another control message is received, superseding an immediately prior control message, such as the exemplary control message 230. As another example, as an explicit identification, the exemplary control message 230 can comprise an enumeration, or specification, of multiple data message identifiers, or a range of data message identifiers, of the data messages, such as the exemplary data messages 240, 251, 252 and 253, to which the control message 230 applies, or with which the control message 230 is otherwise associated. As yet another example, as an explicit identification, exemplary control message 230 can comprise an identification of, for example, a sending application, such as the exemplary application 111, or a specific communication stream, channel, or path by which data messages can be identified or enumerated.

Although illustrated as separate components, the exemplary active intelligent filtering components can be part of the applications that are exchanging values. Thus, for example, the exemplary active intelligent filtering component 220 can be a component of the exemplary receiving application 121, and, similarly, the exemplary active intelligent filtering component 210 can be a component of the exemplary transmitting application 111. According to one aspect, the generation of rules to be applied by the active intelligent filtering component 220, for example, can come, not from the active intelligent filtering component 210, executing on the transmitting computing device 110, but rather from an independent computing device, such as a third computing device that can monitor the communications, or processing, of one or more of the applications, such as the exemplary applications 111 and 121, and can generate rules appropriate for the individual active intelligent filtering components co-located with instances of the applications.

As was indicated, and as will be described in further detail below, the active intelligent filtering, such as that provided by the active intelligent filtering component 220, can filter out received values that appear, such as based on the rules provided by the control message 230, to have been affected by transmission errors while being transmitted across the network 190. More specifically, a network transmission error can result in one or more bits, such as of the exemplary data message 240, being flipped to an opposite binary value. If such an error is not detected, and the data discarded, then the value represented by those bits can differ from the value that was originally transmitted. Such a different value can be detected, not by lower-level error detection that can drop packets, result in retransmissions, and otherwise negatively affect throughput, but rather by higher-level active intelligent filtering components, such as the exemplary active intelligent filtering component 220, based on rules, such as the rules that can be provided by the exemplary control message 230. The active intelligent filtering component 220 can then filter out the value that was received, which can be a different value than that which was originally transmitted, such as due to network transmission errors, and the active intelligent filtering component 220 can, instead, generate replacement values, again, according to rules, such as the rules that can be provided by the exemplary control message 230. In such an instance, an application, such as the exemplary application 121, that can comprise tolerance in variation of received values, such that the exemplary application 121 can generate sufficiently accurate results, or other output, even though the received values may differ slightly from the transmitted values, can forgo error detection at lower network stack levels and can, instead, rely upon active intelligent filtering to filter out certain network transmission errors. As a result, error detection performed at lower network stack levels, such as at the packet evaluation level, can be deactivated and not performed. Without such error detection, packets will not be dropped due to errors, and the throughput of the communications between the exemplary computing devices 110 and 120, can increase.

One mechanism by which error detection at lower network stack levels can be deactivated can be to implement cut-through routing, such as is illustrated by the option 221, which can be set at the receiving computing device 120. In such an instance, the lower network stack levels can provide data to higher levels, such as the exemplary active intelligent filtering component 220, without having performed any error detection, and, as a result, the values received by the active intelligent filtering component 220 may differ from those transmitted by the application 111, executing on the transmitting computing device 110. Other mechanisms for deactivating, or bypassing, packet-based error detection and/or correction, or other lower network stack level error detection and/or correction, can likewise be implemented. To indicate that such error detection and/or error correction has been deactivated, the exemplary networking software 112 and 122 are illustrated via dashed lines in FIG. 2.

Figure 3:
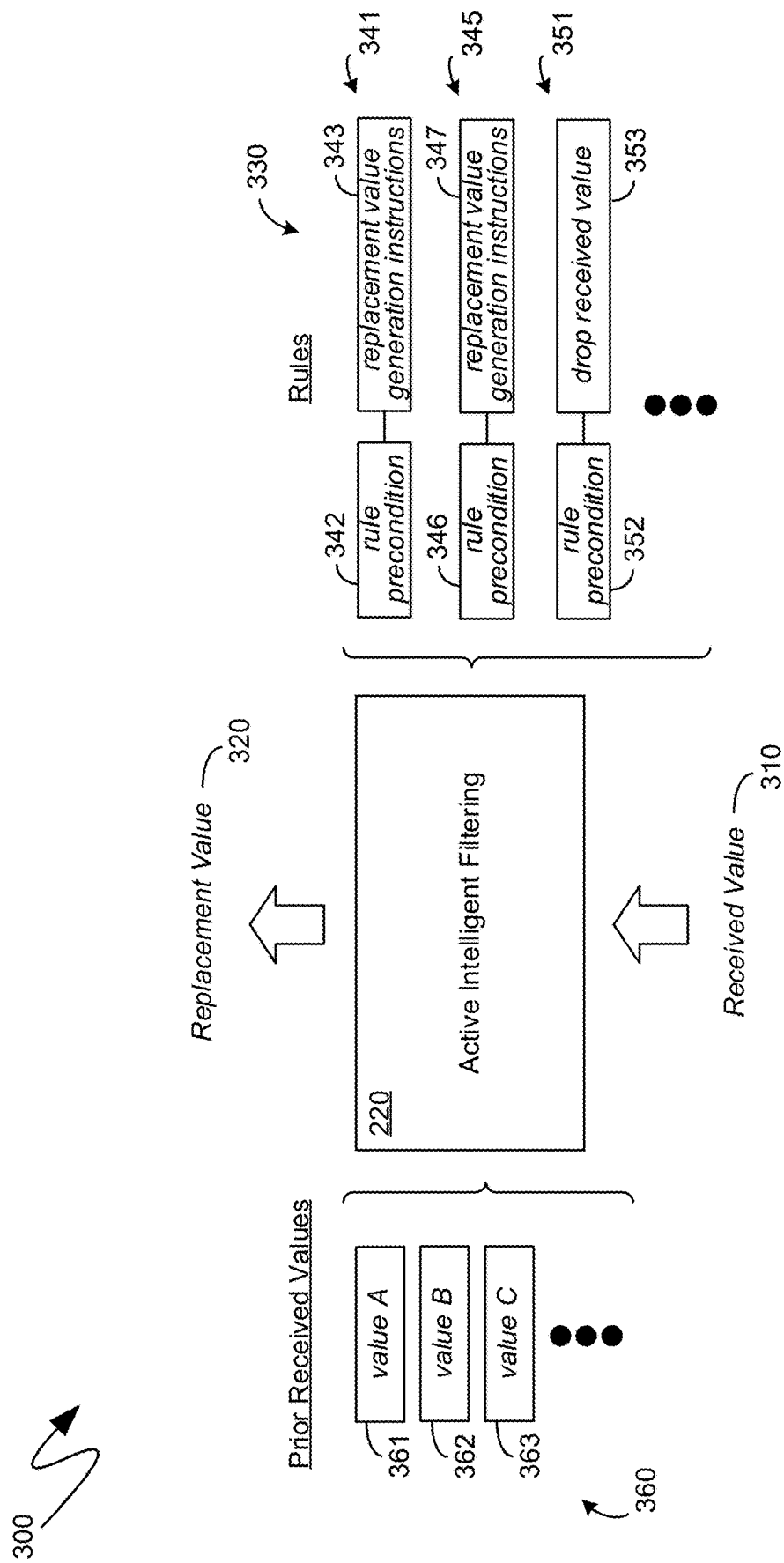
FIG. 3 is a system diagram of an exemplary active intelligent message filtering mechanism.

Turning to FIG. 3, the exemplary system 300 shown therein illustrates an aspect of the operation of an exemplary active intelligent filtering component, such as the exemplary active intelligent filtering component 220 shown in FIG. 2. As indicated previously, active intelligent filtering can filter out a received value, such as the exemplary received value 310, and not provide it to the application. Instead, according to one aspect, in its place, a replacement value, such as the exemplary replacement value 320, can be provided. In such a manner, error detection at lower layers of a networking stack, such as at the packet evaluation level, can be bypassed or otherwise deactivated.

According to one aspect, the determination of which received values, such as the exemplary received value 310, should be filtered out, and which should then be replaced with replacement values, such as the exemplary replacement value 320, can be based on rules, such as the exemplary rules 330. As detailed above, rules, such as the exemplary rules 330, can be received from external sources, including, for example, processes executing on the transmitting computing device, and processes executing on computing devices external to the communications between the transmitting and receiving computing devices. Rules, such as the exemplary rules 341, 345 and 351 can comprise rule preconditions which can be utilized to determine whether the received value 310 has a specific value, is within a range, or meets some other condition that will trigger application of the corresponding rules. A corresponding rule can then comprise instructions by which an active intelligent filtering component, such as the exemplary active intelligent filtering component 220, can generate a replacement value, such as the replacement value of 320.

Accordingly, the exemplary rule 341 is illustrated in FIG. 3 as comprising a rule precondition, namely the exemplary rule precondition 342, and corresponding rule by which the replacement value can be generated, such as in the form of the exemplary replacement value generation instructions 343. Similarly, the exemplary rule 345 can comprise an exemplary rule precondition 346 and exemplary replacement value generation instructions 347. In some instances, the received value may be sufficiently important, or sufficiently ambiguous, that the generation of a replacement value may not be practical or appropriate. In such an instance, a corresponding rule may simply call for the received value to be dropped, or otherwise discarded, without any replacement value being generated. While this may result in a retransmission, incurring the inefficiencies detailed above, such may not be the case, as the relevant processes may be able to proceed without the dropped value. For example, in some instances, it may be more efficient, and more accurate, to simply provide no value, than to provide a replacement value that is inaccurate. Accordingly, at least one of the rules 330 can include a rule where, if the precondition is met, the corresponding rule simply calls for the received value to be dropped and not replaced. Thus, for example, the exemplary rule 351 can comprise an exemplary rule precondition 352 and a corresponding rule 353 that can specify the dropping of the received value, without the generation of a replacement value, if the precondition 352 is met.

The ellipses illustrated in FIG. 3 are meant to represent that, at any given time, and active intelligent filtering component, such as the exemplary active intelligent filtering component 220, can implement multiple concurrent rules. More specifically, the active intelligent filtering component 220 can compare the received value 310 to multiple rule preconditions, such as the exemplary rule preconditions 342, 345 and 352, and, if appropriate, utilize corresponding replacement value generation instructions, such as the exemplary replacement value generation instructions 343 and 347, to generate the replacement value 320, which can be provided in place of the received value 310, thereby addressing network transmission errors, and other errors, through active intelligent filtering, as opposed to packet-based error detection and packet retransmission requests which can be inefficient and reduce network throughput.

One type of rule precondition can be a range-based precondition, such as a precondition that evaluate whether or not the received value 310 is within a specific range of values. The range of values can be based on constant, fixed values, or can be based on previously received values, such as the exemplary previously received values 360, which can include the exemplary previously received value 361, 362 and 363, as well as other previously received values. Because reference may be made to previously received values, the active intelligent filtering component 220 can be a stateful component in that it can maintain information regarding prior events.

Range-based preconditions can be useful in machine learning environments where values can converge over multiple iterations, such that, within any given iteration, the range of expected values can be accurately estimated. Thus, for example, one range-based precondition can simply be the determination of whether the received value 310 is between two other directly specified values. As another example, another range-based precondition can be the determination of whether the received value 310 is within a range whose upper boundary, lower boundary, or both, are derived from other information, such as the exemplary previously received values 360. For example, a range-based precondition can be that the received value 310 is greater than any previously received value, such as the previously received values 361, 362 and 363. As another example, a range-based precondition can be that the received value 310 is greater than a specific previously received value, such as the exemplary previously received value 361, or greater than the previously received value 361 summed with an appropriate incremental value. Similarly, a range-based precondition can be that the received value 310 is less than any previously received value, or less than a specific previously received value, either by itself or after having subtracted therefrom an appropriate decremental value. In such a manner, values that are expected to be monotonically increasing and/or decreasing, exponentially increasing and/or decreasing, and the like, can be accounted for.

As indicated previously, multiple rules, such as the exemplary rules 330, can be concurrently applied by the active intelligent filtering component 220. Accordingly, multiple rule preconditions can, when evaluated together, result in the evaluation of whether the received value 310 is within one or more nested ranges. For example, one rule, such as the exemplary rule 341, can comprise an exemplary rule precondition 342 that can be based on whether or not the received value is within a given range. Another rule, such as the exemplary rule 345, can comprise an exemplary rule precondition 346 that can be based on whether or not the received value is within a smaller range. As a result, the received value 310 can satisfy the first rule precondition, but not the second, satisfy both rule preconditions, or satisfy neither, and an appropriate action to be taken can be based on the replacement value generation instructions, such as the exemplary replacement value generation instructions 343 and 347, corresponding to the rule preconditions that are determined to be satisfied.

According to one aspect, one type of replacement value generation instruction can be to generate a replacement value that is a single specified value. For example, if a rule precondition is met, the corresponding replacement value generation instruction can simply be an instruction that the replacement value 320 is to be a specified constant value, such as, as a particular example, the value "three".

According to one aspect, another type of replacement value generation instruction can be to generate a replacement value based on one or more variables, such as one or more of the prior received values 360. For example, if a rule precondition is met, the corresponding replacement value generation instruction can be an instruction that the replacement value 320 is to be the previously received value such as, for example, the exemplary value 361. Or, the corresponding replacement value generation instruction can be an instruction that the replacement value 320 is to be the previously received value added to an appropriate incremental value, or the previously received value with an appropriate decremental value subtracted therefrom. As yet another example, a corresponding replacement value generation instruction can be to multiply one or more previously received values with an appropriate multiple such as, for example, that the replacement value 320 is to be 90% of the previously received value. As yet another example, if a rule precondition is met, the corresponding replacement value generation instruction can be an instruction that the replacement value 320 is to be an average of the last three previously received values such as, for example, the exemplary values 361, 362 and 363. Other like functional relationships can be utilized to define how the replacement value 320 is to be determined based on one or more available variables, such as one or more previously received values.

According to one aspect, yet another type of replacement value generation instruction can be to generate a replacement value based upon the received value 310. For example, if a range-based rule precondition is met, the replacement value 320 generated by the corresponding replacement value generation instruction can be the received value 310 as "snapped to" a range, which can be the same range as the rule-based precondition, or a different range. As a specific example, if a range-based precondition evaluated whether the received value was between six and eight, then a "snapping to" that range can entail utilizing the received value 310 if the received value is between six and eight, replacing the received value 310 with a replacement value 320 of "six" if the received value is less than six, and replacing the received value 310 with a replacement value 320 of "eight" if the received value is greater than eight. More generally, the active intelligent filtering component 220 can avoid filtering out a received value if the received value is within a range specified by a range-based rule precondition, and the received value 310 can be filtered out, and can be replaced with a replacement value 320 that is the upper bound of the range if the received value 310 is above the range specified, and can be replaced with a replacement value 320 that is the lower bound of the range if the received value 310 is below the range specified.

According to another aspect, combinations of the above replacement value generation instructions can be utilized. For example, replacement value generation instructions corresponding to range-based rule preconditions can replace received values with replacement values that are a single, constant value, multiples of the upper or lower bounds of a range, or other like combinations of the above.

Rule preconditions can be based on factors other than the received value 310. For example, specific parts of a message may be "protected" by an error detection code such that transmission errors occurring within those parts of a message may be detected by reference to the error detection code. Accordingly, one rule precondition can be the detection that the received value 310 is determined to comprise transmission errors by reference to an error detection code associated with the received value 310. In such an instance, corresponding replacement value generation instructions can utilize any of the above described mechanisms to instruct the active intelligent filtering component 220 to generate a replacement value 320. For example, corresponding replacement value generation instructions can instruct the active intelligent filtering component 220 to replace a received value 310, that is determined, such as by reference to an error detection code associated with the received value 310, to be an incorrect received value due to transmission errors, with a replacement value 320 that is equal to, or a multiple of, a previously received value, such as the exemplary immediately prior received value 361. Another corresponding replacement value generation instruction can reference other data of a message, such as an error correction code that can be associated with a portion of the message comprising the received value 310. For example, corresponding replacement value generation instructions can instruct the active intelligent filtering component 220 to replace a received value 310, that is determined, such as by reference to an error detection code associated with the received value 310, to be an incorrect received value due to transmission errors, with a replacement value 320 that is an error corrected version of the received value 310, error corrected by the active intelligent filtering component 220 with reference to the error correction code.

Figure 4:
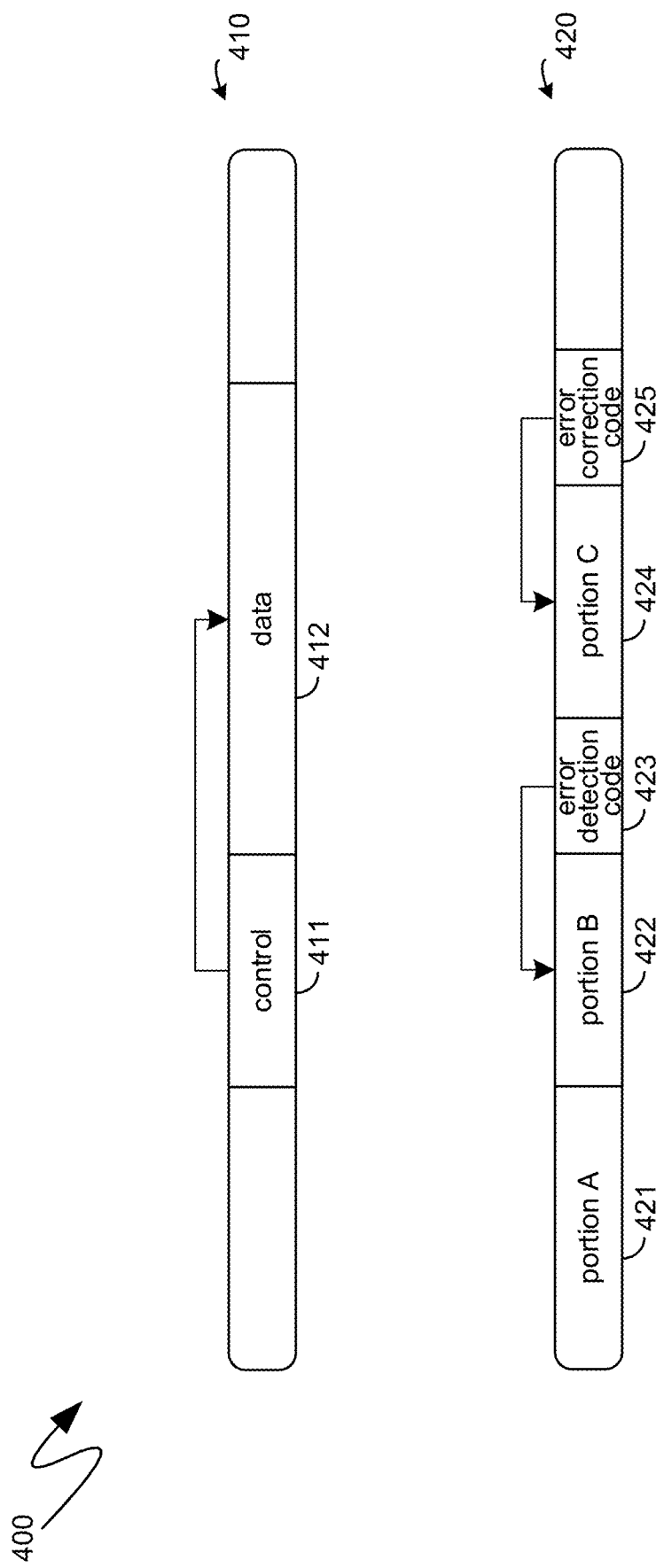
FIG. 4 is a system diagram of exemplary messages supporting active intelligent message filtering.

Turning to FIG. 4, the system 400 shown therein illustrates two exemplary messages, namely the exemplary messages 410 and 420. According to one aspect, portions of a message can be protected by error detection codes, or error correction codes, so that transmission errors resulting in bit flips, or other like digital changes, within the bits of those portions of the message, can be detected. For example, the exemplary message 420 can comprise a portion 421 whose digital data can have no error detection code associated with it. As a result, as detailed above, errors occurring within the portion 421 may not be definitively detected, and can, instead, be accommodated by the active intelligent filtering detailed above.

By contrast, the exemplary message 420 can comprise a further portion 423 that can have an error detection code, such as the exemplary error detection code 423, associated therewith. Upon receipt, an independent generation of the error detection code from the received portion 422 can be performed, and if the error detection code independently generated by the receiving computing device differs from the error detection code 423 provided with the exemplary message 420, a determination can be made that a transmission error occurred within the portion 422 of the exemplary message 420. As detailed above, such a determination can be the basis of a rule precondition, which can then trigger the performance of replacement value generation instructions to generate a replacement value for the received value, received from the portion 422, which is now known to have encountered transmission errors.

In addition to error detection codes, such as the exemplary error detection code 423, messages, such as the exemplary message 420, can comprise error correction codes. Thus, for example, a portion 424 of the exemplary message 420 can have an error correction code 425 associated with it. The error correction code 425 can then be utilized to correct any digital bit errors occurring within the portion 424. As detailed above, utilization of such an error correction code 425 can be rule-based, such that the utilization of the error correction code 425 enables an active intelligent filtering to filter out the incorrect value received from the portion 424 comprising one or more transmission errors, and, instead, generate a correct value from the error correction code 425 to provide the correct value to the application.

Because error detection codes and error correction codes can be applied to only portions of the message, such as the exemplary portions 422 and 424 of the exemplary message 420, the inefficiencies with traditional packet-based error detection, namely the discarding of an entire packet irrespective of which portion of data was impacted by an error, and triggering corresponding retransmissions, can be avoided.

As indicated previously, according to one aspect, the provision of rule information, including rule preconditions and corresponding instructions as to how to generate a replacement value, can be within the context of control messages, which can be separate from data messages and can specify the data messages to which they apply. As also indicated previously, according to an alternative aspect, a control message can be provided together with a data message to which it applies within a single message, such as the exemplary message 410. The co-provision of the control information, such as the exemplary control information 411, and data information, such as the exemplary data information 412 can be an implicit indication that the control information 411 applies to the data information 412. A single message, such as the exemplary message 410, can comprise one or more pairs of such control and data information.

Figure 5:
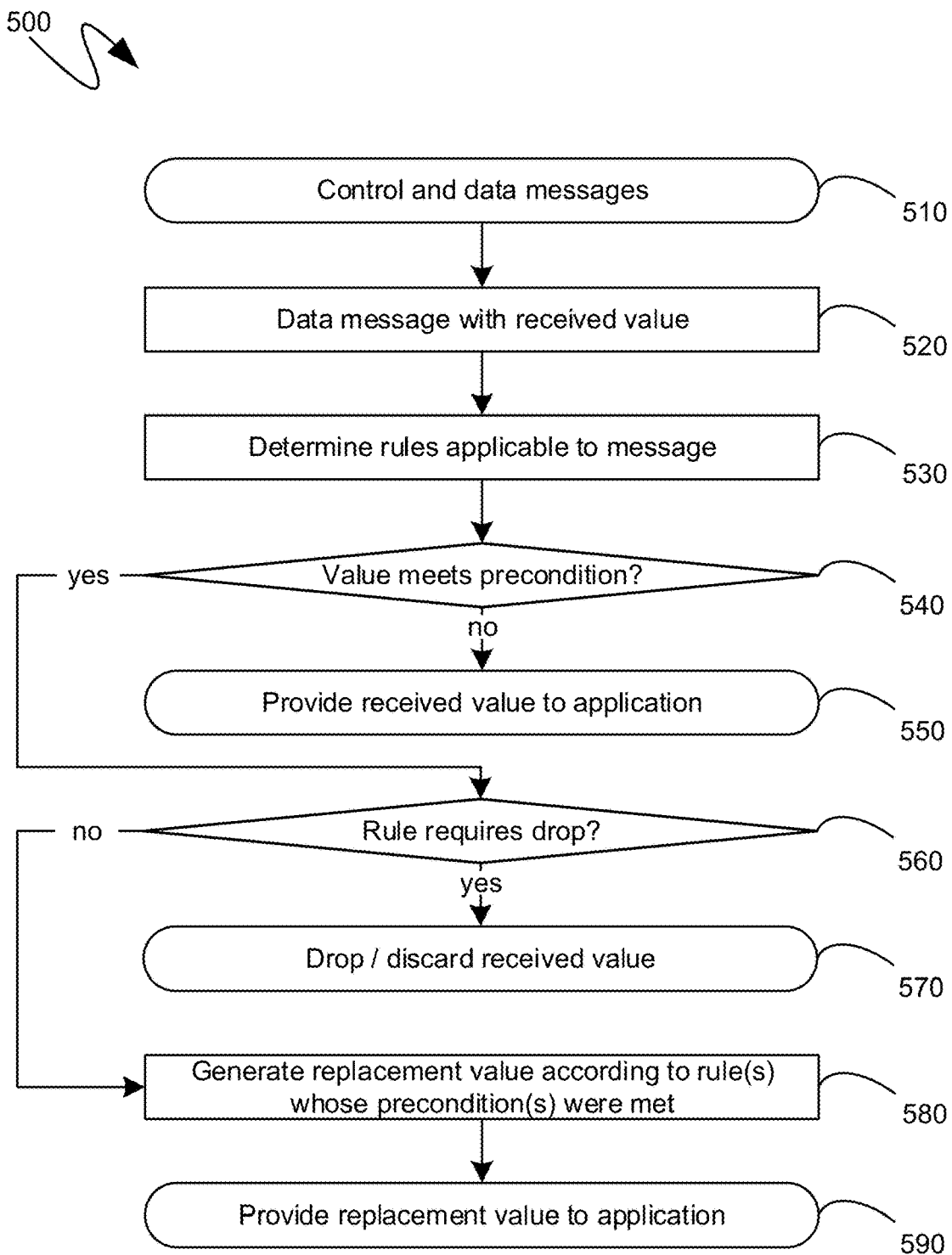
FIG. 5 is a flow diagram of an exemplary active intelligent message filtering mechanism.

Turning to FIG. 5, the exemplary flow diagram 500 shown therein illustrates an exemplary series of steps by which active intelligent filtering can be applied to increase network throughput. Initially, at step 510, control and data messages can be received, either in a single message, or across multiple messages. At step 520 a received value can be extracted from the data of a data message. At step 530, rules applicable to the message of step 520 can be determined. As indicated previously, implicit or explicit indications, of which data messages specific rules apply to, can be part of control messages transmitting such rules. At step 540, the value of step 520 can be considered within the context of one or more rule preconditions of the rules determined at step 530. If the received value does not meet any of those rule preconditions, it can be provided, unfiltered, to the application at step 550. Conversely, if the received value does meet one or more rule preconditions, the corresponding instructions can be utilized to actively intelligently filter the value of step 520. As an initial matter, a determination can be made, such as at step 560, whether the corresponding instructions call for the received value to simply be dropped, with no replacement value being generated, such as detailed above. If, at step 560, it is determined that the rule, corresponding to the rule precondition identified at step 530, requires that the received value be dropped without the generation of a replacement value, then such a drop can occur at step 570. Such a drop, without a replacement value, may result in a retransmission request, or operation of the relevant processes may simply continue without the dropped value. Conversely, if, at step 560, it is determined that the corresponding rule instructions call for the generation of a replacement value, the corresponding instructions to generate replacement value can be performed at step 580. Then, at step 590, the replacement value can be provided to the application in place of the received value, which can have been filtered out.

Figure 6:
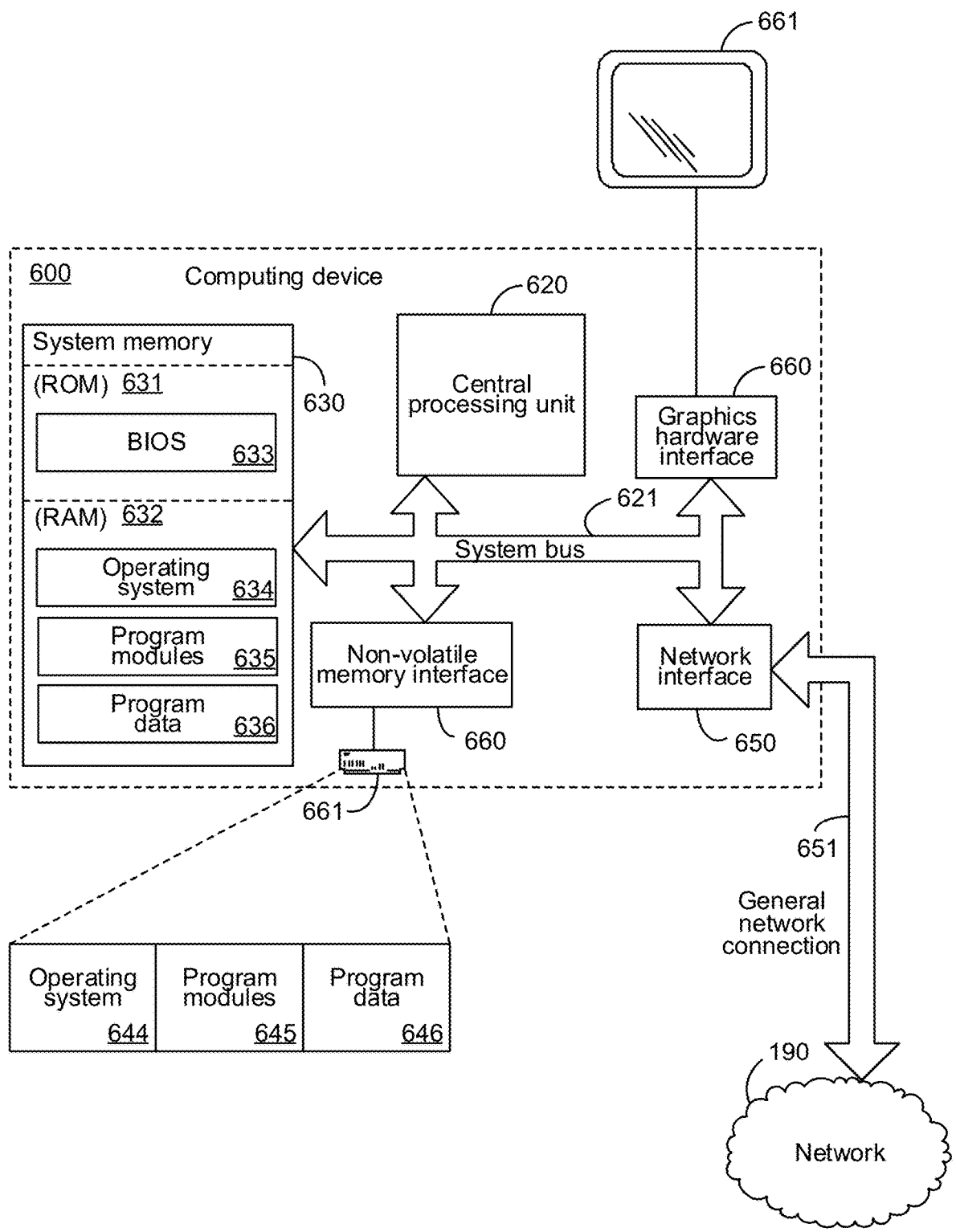
FIG. 6 is a block diagram of an exemplary computing device.

Turning to FIG. 6, an exemplary computing device 600 is illustrated which can perform some or all of the mechanisms and actions described above. The exemplary computing device 600 can include, but is not limited to, one or more central processing units (CPUs) 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. The computing device 600 can optionally include graphics hardware, including, but not limited to, a graphics hardware interface 660 and a display device 661, which can include display devices capable of receiving touch-based user input, such as a touch-sensitive, or multi-touch capable, display device. Depending on the specific physical implementation, one or more of the CPUs 620, the system memory 630 and other components of the computing device 600 can be physically co-located, such as on a single chip. In such a case, some or all of the system bus 621 can be nothing more than silicon pathways within a single chip structure and its illustration in FIG. 6 can be nothing more than notational convenience for the purpose of illustration.

The computing device 600 also typically includes computer readable media, which can include any available media that can be accessed by computing device 600 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 600. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer content between elements within computing device 600, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, other program modules 635, and program data 636.

The computing device 600 may also include other removable/non-removable, volatile/nonvolatile computer storage media. By way of example only, FIG. 6 illustrates a hard disk drive 641 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 641 is typically connected to the system bus 621 through a non-volatile memory interface such as interface 640.

The drives and their associated computer storage media discussed above and illustrated in FIG. 6, provide storage of computer readable instructions, data structures, program modules and other data for the computing device 600. In FIG. 6, for example, hard disk drive 641 is illustrated as storing operating system 644, other program modules 645, and program data 646. Note that these components can either be the same as or different from operating system 634, other program modules 635 and program data 636. Operating system 644, other program modules 645 and program data 646 are given different numbers hereto illustrate that, at a minimum, they are different copies.

The computing device 600 may operate in a networked environment using logical connections to one or more remote computers. The computing device 600 is illustrated as being connected to the general network connection 651 (to the network 190) through a network interface or adapter 650, which is, in turn, connected to the system bus 621. In a networked environment, program modules depicted relative to the computing device 600, or portions or peripherals thereof, may be stored in the memory of one or more other computing devices that are communicatively coupled to the computing device 600 through the general network connection 661. It will be appreciated that the network connections shown are exemplary and other means of establishing a communications link between computing devices may be used.

Although described as a single physical device, the exemplary computing device 600 can be a virtual computing device, in which case the functionality of the above-described physical components, such as the CPU 620, the system memory 630, the network interface 640, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 600 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example a computing device comprising: one or more processing units; and one or more computer-readable storage media comprising computer-executable instructions, which, when executed by at least some of the processing units, cause the computing device to: receive a control message identifying a first set of one or more data messages and specifying a first set of one or more rules, wherein each rule in the first set of one or more rules identifies a rule applicability precondition and a corresponding intelligent filtering to be applied to values received in the first set of one or more data messages if the rule applicability precondition is satisfied; receive a first data message comprising a first value; and intelligently filter the first value in accordance with the first set of one or more rules if the first data message is determined to be in the first set of one or more data messages; wherein a first rule applicability precondition, of a first rule, of the first set of one or more rules, is the first value being outside of a first range of values; and wherein further the intelligent filtering of the first value in accordance with the first rule comprises replacing the first value with a first replacement value specified by the first rule.

A second example is the computing device of the first example, wherein the first replacement value is a first highest threshold value if the first value was greater than the first highest threshold value and is a first lowest threshold value if the first value was less than the first lowest threshold value, the first range being bounded by the first highest threshold value and the first lowest threshold value.

A third example is the computing device of the first example, wherein the first replacement value is based on a second value from a second data message that was received immediately prior to the first data message, the second data message also being part of the first set of one or more data messages.

A fourth example is the computing device of the third example, wherein the replacing the first value with the first replacement value comprises deriving the first replacement value from the second value in accordance with a function specified by the first rule.

A fifth example is the computing device of the first example, wherein the first replacement value is based on multiple values from a second set of one or more data messages that were received immediately prior to the first data message, the second set of one or more data messages also being part of the first set of one or more data messages.

A sixth example is the computing device of the first example, wherein a second rule applicability condition, of a second rule, of the first set of one or more rules, is the first value being inside of the first range of values but outside a second range of values; and wherein further the intelligent filtering of the first value in accordance with the second rule comprises replacing the first value with a second replacement value specified by the second rule, the second replacement value being a second highest threshold value if the first value was greater than the second highest threshold value but lower than the first highest threshold value and is a second lowest threshold value if the first value was less than the second lowest threshold value but higher than the first lowest threshold value, the second range being bounded by the second highest threshold value and the second lowest threshold value.

A seventh example is the computing device of the first example, wherein a second rule applicability condition, of a second rule, of the first set of one or more rules, is a determination that the first data message, as received, comprises errors, the determination being made with reference to an error detection code associated with the first data message; and wherein further the intelligent filtering of the first value in accordance with the second rule comprises replacing the first value with a second replacement value specified by the second rule.

An eighth example is the computing device of the seventh example, wherein the second replacement value is an error corrected version of the first value that is derived from the first value and an error correction code associated with the first data message.

A ninth example is the computing device of the seventh example, wherein the second replacement value is a highest threshold value if the first value was greater than the highest threshold value and is a lowest threshold value if the first value was less than the lowest threshold value.

A tenth example is the computing device of the seventh example, wherein the second replacement value is based on a second value from a second data message that was received immediately prior to the first data message, the second data message also being part of the first set of one or more data messages.

An eleventh example is the computing device of the first example, wherein the control message is received from a different source than the first data message.

A twelfth example is the computing device of the first example, wherein the control message and the first data message are received by being sequentially read from a first computer-readable storage medium that is communicationally coupled to the computing device.

A thirteenth example is the computing device of the first example, wherein the first set of one or more data messages are identified by the control message based on message identifiers, each data message of the first set of one or more data messages comprising a unique message identifier.

A fourteenth example is the computing device of the first example, wherein the first set of one or more data messages are identified by the control message as being received immediately subsequent to the control message and prior to a receipt of a second control message.

A fifteenth example is the computing device of the first example, wherein a single message is both the control message and the first data message, the first set of one or more data messages being only the first data message, the control message inherently identifying the first data message by being part of the single message with the first data message.

A sixteenth example is the computing device of the first example, wherein the control message specifies a data format in accordance which the first value is represented in the first data message.

A seventeenth example is a system comprising: a receiving computing device comprising: one or more receiving computing device processing units; and one or more receiving computing device storage media comprising computer-executable instructions, which, when executed by at least some of the receiving computing device processing units, cause the receiving computing device to: receive a control message identifying a first set of one or more data messages and specifying a first set of one or more rules, wherein each rule in the first set of one or more rules identifies a rule applicability precondition and a corresponding intelligent filtering to be applied to values received in the first set of one or more data messages if the rule applicability precondition is satisfied; receive a first data message comprising a first value; and intelligently filter the first value in accordance with the first set of one or more rules if the first data message is determined to be in the first set of one or more data messages; wherein a first rule applicability precondition, of a first rule, of the first set of one or more rules, is the first value being outside of a first range of values; and wherein further the intelligent filtering of the first value in accordance with the first rule comprises replacing the first value with a first replacement value specified by the first rule; and a second computing device comprising: one or more second computing device processing units; and one or more second computing device storage media comprising computer-executable instructions, which, when executed by at least some of the second computing device processing units, cause the second computing device to: generate the control message; and provide the control message to the receiving computing device.

An eighteenth example is the system of the seventeenth example, wherein the second computing device storage media comprises further computer-executable instructions, which, when executed by at least some of the second computing device processing units, cause the second computing device to: generate the first data message; and provide the first data message to the receiving computing device.

A nineteenth example is the system of the seventeenth example further comprising a transmitting computing device differing from the second computing device, the transmitting computing device comprising: one or more receiving computing device processing units; and one or more receiving computing device storage media comprising computer-executable instructions, which, when executed by at least some of the receiving computing device processing units, cause the receiving computing device to: generate the first data message; and provide the first data message to the receiving computing device.

A twentieth example is a method of actively intelligently filtering received data messages, the method comprising: receiving, at a computing device, a control message identifying a first set of one or more data messages and specifying a first set of one or more rules, wherein each rule in the first set of one or more rules identifies a rule applicability precondition and a corresponding intelligent filtering to be applied to values received in the first set of one or more data messages if the rule applicability precondition is satisfied; receiving, at the computing device, a first data message comprising a first value; and intelligently filtering, at the computing device, the first value in accordance with the first set of one or more rules if the first data message is determined to be in the first set of one or more data messages; wherein a first rule applicability precondition, of a first rule, of the first set of one or more rules, is the first value being outside of a first range of values; and wherein further the intelligent filtering of the first value in accordance with the first rule comprises replacing the first value with a first replacement value specified by the first rule.

As can be seen from the above descriptions, mechanisms for providing error resiliency with active intelligent filtering of received values have been presented. In view of the many possible variations of the subject matter described herein, we claim as our invention all such embodiments as may come within the scope of the following claims and equivalents thereto.

We claim:

1. A computing device comprising:
   one or more processing units; and
   one or more computer-readable storage media comprising computer-executable instructions, which, when executed by at least some of the processing units, cause the computing device to:
      receive a control message identifying a first set of one or more data messages and specifying a first set of one or more rules, wherein each rule in the first set of one or more rules identifies a rule applicability precondition and a corresponding intelligent filtering to be applied to values received in the first set of one or more data messages if the rule applicability precondition is satisfied;
      receive a first data message comprising a first value; and
      intelligently filter the first value in accordance with the first set of one or more rules if the first data message is determined to be in the first set of one or more data messages;
   wherein a first rule applicability precondition, of a first rule, of the first set of one or more rules, is the first value being outside of a first range of values; and
   wherein further the intelligent filtering of the first value in accordance with the first rule comprises replacing the first value with a first replacement value specified by the first rule.

2. The computing device of claim 1, wherein the first replacement value is a first highest threshold value if the first value was greater than the first highest threshold value and is a first lowest threshold value if the first value was less than the first lowest threshold value, the first range being bounded by the first highest threshold value and the first lowest threshold value.

3. The computing device of claim 1, wherein the first replacement value is based on a second value from a second data message that was received immediately prior to the first data message, the second data message also being part of the first set of one or more data messages.

4. The computing device of claim 3, wherein the replacing the first value with the first replacement value comprises deriving the first replacement value from the second value in accordance with a function specified by the first rule.

5. The computing device of claim 1, wherein the first replacement value is based on multiple values from a second set of one or more data messages that were received immediately prior to the first data message, the second set of one or more data messages also being part of the first set of one or more data messages.

6. The computing device of claim 1, wherein a second rule applicability condition, of a second rule, of the first set of one or more rules, is the first value being inside of the first range of values but outside a second range of values; and
   wherein further the intelligent filtering of the first value in accordance with the second rule comprises replacing the first value with a second replacement value specified by the second rule, the second replacement value being a second highest threshold value if the first value was greater than the second highest threshold value but lower than the first highest threshold value and is a second lowest threshold value if the first value was less than the second lowest threshold value but higher than the first lowest threshold value, the second range being bounded by the second highest threshold value and the second lowest threshold value.

7. The computing device of claim 1, wherein a second rule applicability condition, of a second rule, of the first set of one or more rules, is a determination that the first data message, as received, comprises errors, the determination being made with reference to an error detection code associated with the first data message; and
   wherein further the intelligent filtering of the first value in accordance with the second rule comprises replacing the first value with a second replacement value specified by the second rule.

8. The computing device of claim 7, wherein the second replacement value is an error corrected version of the first value that is derived from the first value and an error correction code associated with the first data message.

9. The computing device of claim 7, wherein the second replacement value is a highest threshold value if the first value was greater than the highest threshold value and is a lowest threshold value if the first value was less than the lowest threshold value.

10. The computing device of claim 7, wherein the second replacement value is based on a second value from a second data message that was received immediately prior to the first data message, the second data message also being part of the first set of one or more data messages.

11. The computing device of claim 1, wherein the control message is received from a different source than the first data message.

12. The computing device of claim 1, wherein the control message and the first data message are received by being sequentially read from a first computer-readable storage medium that is communicationally coupled to the computing device.

13. The computing device of claim 1, wherein the first set of one or more data messages are identified by the control message based on message identifiers, each data message of the first set of one or more data messages comprising a unique message identifier.

14. The computing device of claim 1, wherein the first set of one or more data messages are identified by the control message as being received immediately subsequent to the control message and prior to a receipt of a second control message.

15. The computing device of claim 1, wherein a single message is both the control message and the first data message, the first set of one or more data messages being only the first data message, the control message inherently identifying the first data message by being part of the single message with the first data message.

16. The computing device of claim 1, wherein the control message specifies a data format in accordance which the first value is represented in the first data message.

17. A system comprising:
a receiving computing device comprising:
one or more receiving computing device processing units; and
one or more receiving computing device storage media comprising computer-executable instructions, which, when executed by at least some of the receiving computing device processing units, cause the receiving computing device to:
receive a control message identifying a first set of one or more data messages and specifying a first set of one or more rules, wherein each rule in the first set of one or more rules identifies a rule applicability precondition and a corresponding intelligent filtering to be applied to values received in the first set of one or more data messages if the rule applicability precondition is satisfied;
receive a first data message comprising a first value; and
intelligently filter the first value in accordance with the first set of one or more rules if the first data message is determined to be in the first set of one or more data messages;
wherein a first rule applicability precondition, of a first rule, of the first set of one or more rules, is the first value being outside of a first range of values; and
wherein further the intelligent filtering of the first value in accordance with the first rule comprises replacing the first value with a first replacement value specified by the first rule; and
a second computing device comprising:
one or more second computing device processing units; and
one or more second computing device storage media comprising computer-executable instructions, which, when executed by at least some of the second computing device processing units, cause the second computing device to:
generate the control message; and
provide the control message to the receiving computing device.

18. The system of claim 17, wherein the second computing device storage media comprises further computer-executable instructions, which, when executed by at least some of the second computing device processing units, cause the second computing device to:
generate the first data message; and
provide the first data message to the receiving computing device.

19. The system of claim 17 further comprising a transmitting computing device differing from the second computing device, the transmitting computing device comprising:
one or more receiving computing device processing units; and
one or more receiving computing device storage media comprising computer-executable instructions, which, when executed by at least some of the receiving computing device processing units, cause the receiving computing device to:
generate the first data message; and
provide the first data message to the receiving computing device.

20. A method of actively intelligently filtering received data messages, the method comprising:
receiving, at a computing device, a control message identifying a first set of one or more data messages and specifying a first set of one or more rules, wherein each rule in the first set of one or more rules identifies a rule applicability precondition and a corresponding intelligent filtering to be applied to values received in the first set of one or more data messages if the rule applicability precondition is satisfied;
receiving, at the computing device, a first data message comprising a first value; and
intelligently filtering, at the computing device, the first value in accordance with the first set of one or more rules if the first data message is determined to be in the first set of one or more data messages;
wherein a first rule applicability precondition, of a first rule, of the first set of one or more rules, is the first value being outside of a first range of values; and
wherein further the intelligent filtering of the first value in accordance with the first rule comprises replacing the first value with a first replacement value specified by the first rule.

* * * * *